Sept. 25, 1951  H. GUTHMANN  2,568,730
APPARATUS FOR FORMING FLUTES IN HOLLOW LAMP POSTS
Filed March 16, 1949  5 Sheets-Sheet 1

Inventor
Hans Guthmann

Sept. 25, 1951     H. GUTHMANN     2,568,730
APPARATUS FOR FORMING FLUTES IN HOLLOW LAMP POSTS
Filed March 16, 1949     5 Sheets-Sheet 2

Inventor
Hans Guthmann

By *Clarence A. O'Brien and Harvey B. Jacobson*
Attorneys

Sept. 25, 1951  H. GUTHMANN  2,568,730
APPARATUS FOR FORMING FLUTES IN HOLLOW LAMP POSTS
Filed March 16, 1949  5 Sheets-Sheet 3
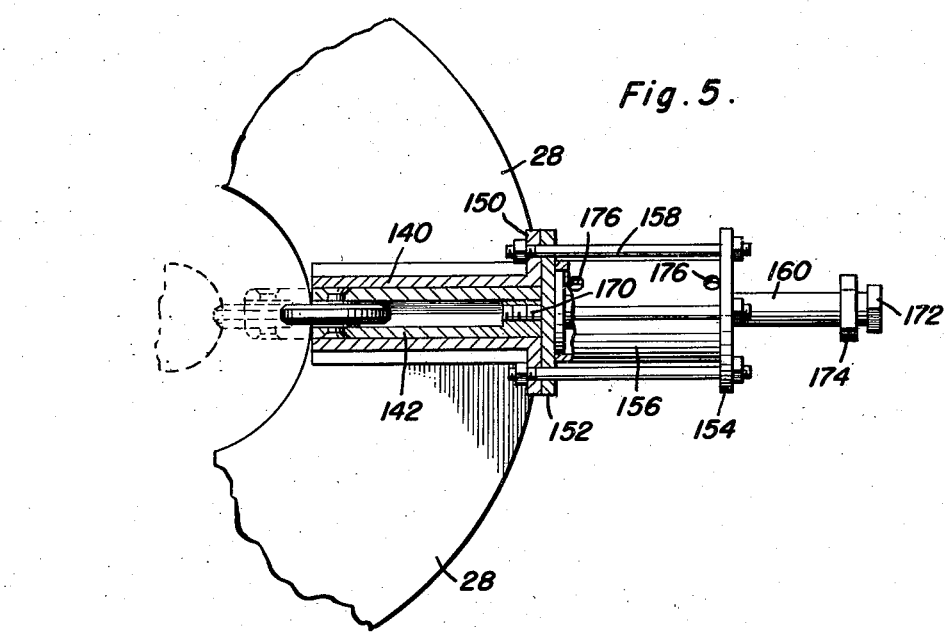
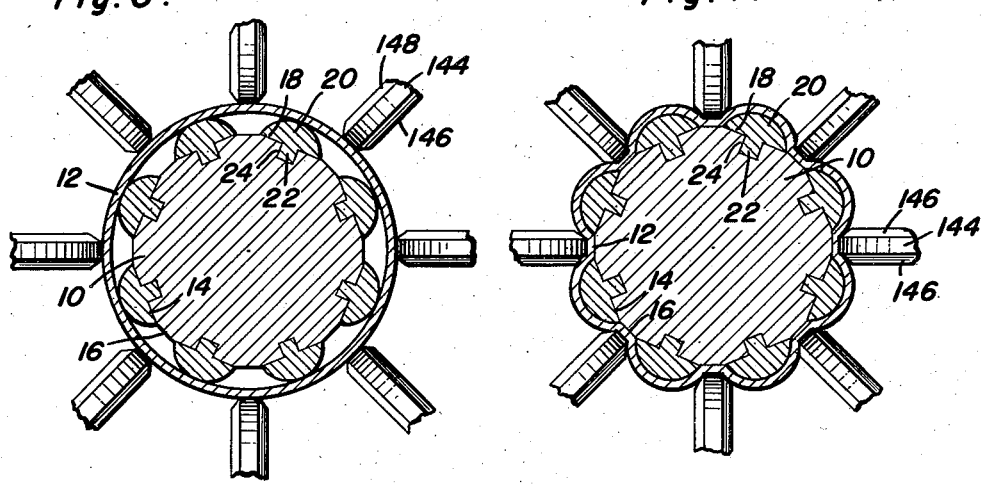
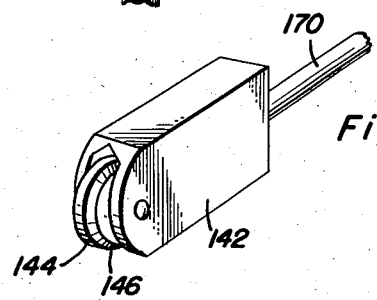
Inventor
Hans Guthmann Sept. 25, 1951 H. GUTHMANN 2,568,730
APPARATUS FOR FORMING FLUTES IN HOLLOW LAMP POSTS
Filed March 16, 1949 5 Sheets-Sheet 4
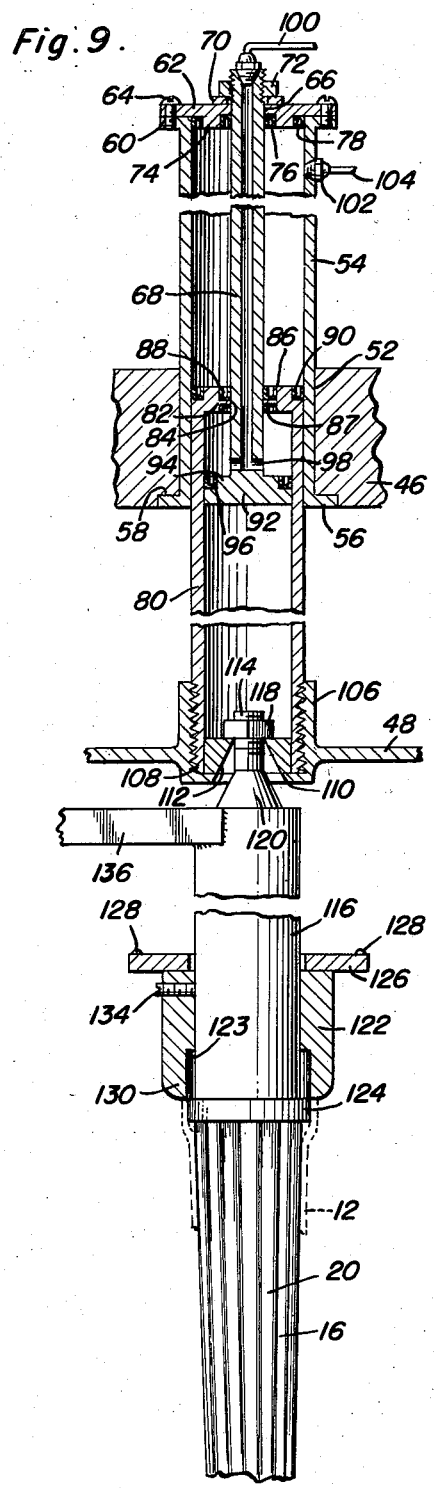
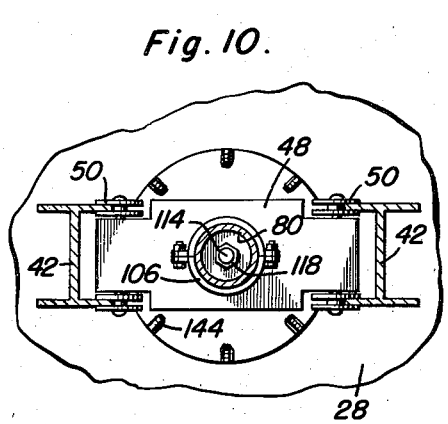
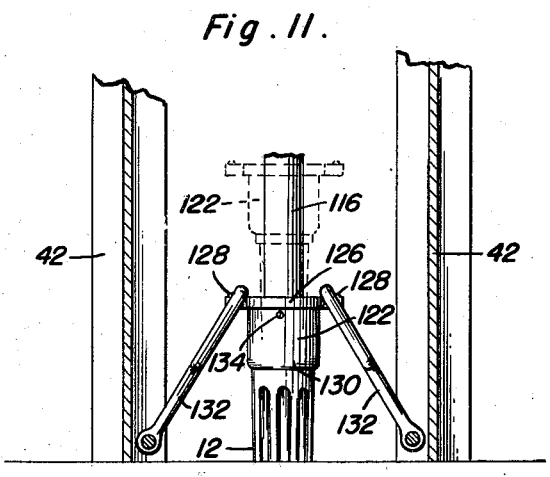
Inventor
Hans Guthmann

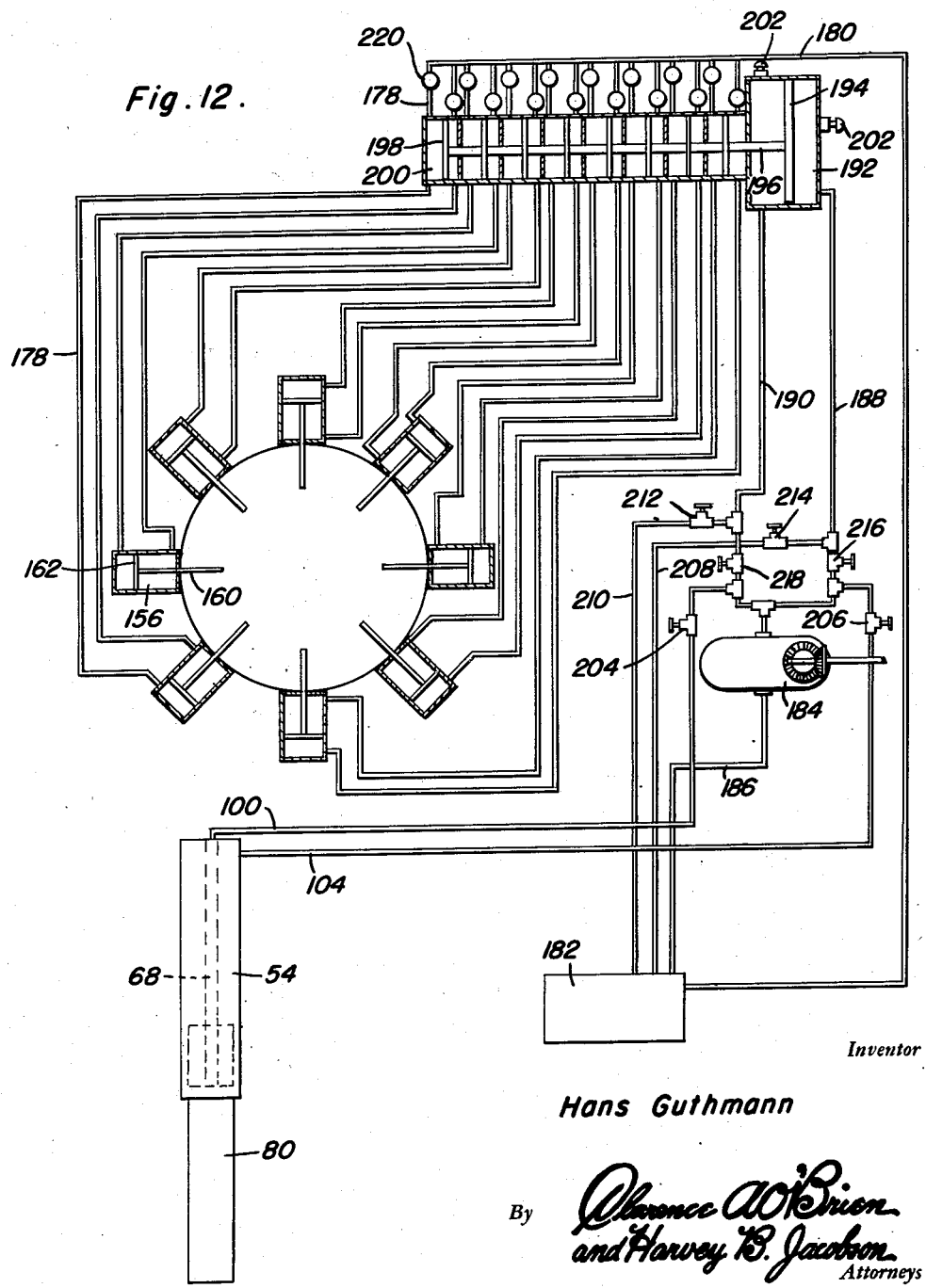

Patented Sept. 25, 1951

2,568,730

UNITED STATES PATENT OFFICE 2,568,730

APPARATUS FOR FORMING FLUTES IN HOLLOW LAMPPOSTS

Hans Guthmann, Pasadena, Md.

Application March 16, 1949, Serial No. 81,698

17 Claims. (Cl. 153—70)

1

This invention relates to new and useful improvements in fluting machines and the primary object of the present invention is to provide a machine for fluting tapered metal columns.

Yet another important object of the present invention is to provide a fluting machine including a plurality of flute forming rollers and a vertically movable mandrel supporting a metal column that is forced against the rollers as the mandrel is lowered, and due to the vertical movement of the mandrel the unusually large area or space required for horizontally movable mandrels is eliminated.

Another very important object of the present invention is to provide a machine for fluting metal columns including a vertically movable mandrel inserted within a column and embodying novel and improved means for loosening the column from the mandrel as the mandrel is raised.

Another object of the present invention is to provide an apparatus having the aforementioned features and including a means whereby the mandrel will be swung to a vertically inclined position, automatically, during the raising of the mandrel so that the column may be removed from the mandrel to a convenient manner.

Another feature of the present invention is to provide a fluting machine including a vertically movable carriage and means detachably securing a mandrel to the carriage so that the mandrel and carriage may be quickly and readily secured to or removed from each other.

Another feature of the present invention is to provide a machine for fluting metal columns including a plurality of radially movable roller units for pressing against a metal column and embodying a means for independently adjusting and limiting the sliding movement of the roller units so that grooves or recesses of a predetermined depth may be formed in the column.

Another feature of the present invention is to provide a fluting machine including a mandrel raising and lowering means, flute forming roller actuating means and novel and improved means for operating both of said aforementioned means so that as a column is moved vertically, flutes wiill be made in the column.

Another feature of the present invention is to provide an apparatus for fluting metal columns so constructed as to permit flutes to be formed in a column as the said column is raised or lowered.

Another feature of the present invention is to provide a machine for fluting metal columns so designed as to reduce the maintenance required due to the relative arrangement of parts.

2

A further object of the present invention is to provide a fluting machine that is manually controlled so that continuous or broken flutes may be formed in a metal column as the column is raised or lowered against a plurality of flute forming rollers.

A still further aim of the present invention is to provide an apparatus of the aforementioned character that is simple and practical in construction, strong and reliable in use, durable and highly efficient in operation, small and compact in structure, neat and attractive in appearance, relatively inexpensive to manufacture, and otherwise well adapted for the purposes for which the same in intended.

Other objects and advantages reside in the details of construction and operation as more fully hereinafter described and claimed, reference being had to the accompanying drawings forming part hereof, wherein like numerals refer to like parts throughout, and in which:

Figure 1 is an elevational view of the present invention and showing the same in use;

Figure 2 is a reduced elevational view of the present invention and showing the manner in which the mandrel and the column on the mandrel are swung outwardly as the mandrel is raised;

Figure 5 is a sectional view taken substantially on the plane of section line 5—5 of Figure 4;

Figure 6 is an enlarged transverse horizontal sectional view showing the first flute forming operation;

Figure 7 is a view similar to Figure 6 and showing the manner in which the rollers are urged against the metal column to force the column over the ribs of the mandrel;

Figure 8 is a perspective view of one of the slides used in conjunction with the present invention and showing a flute forming roller applied thereto;

Figure 9 is an enlarged, fragmentary, longitudinal vertical sectional view of Figure 1 and illustrating the mandrel raising and lowering means as well as the means for securing the mandrel to the carriage and to the raising and lowering means for the mandrel;

Figure 10 is an enlarged transverse horizontal sectional view taken substantially on the plane of section line 10—10 of Figure 1;

Figure 11 is an enlarged, fragmentary view of Figure 1 showing the carriage support in cross-section and illustrating the manner in which the metal column is loosened from the mandrel during the raising of the mandrel and the column on the mandrel; and Figure 12 is a diagrammatic view showing the hydraulic system for the present invention.

Figure 3:
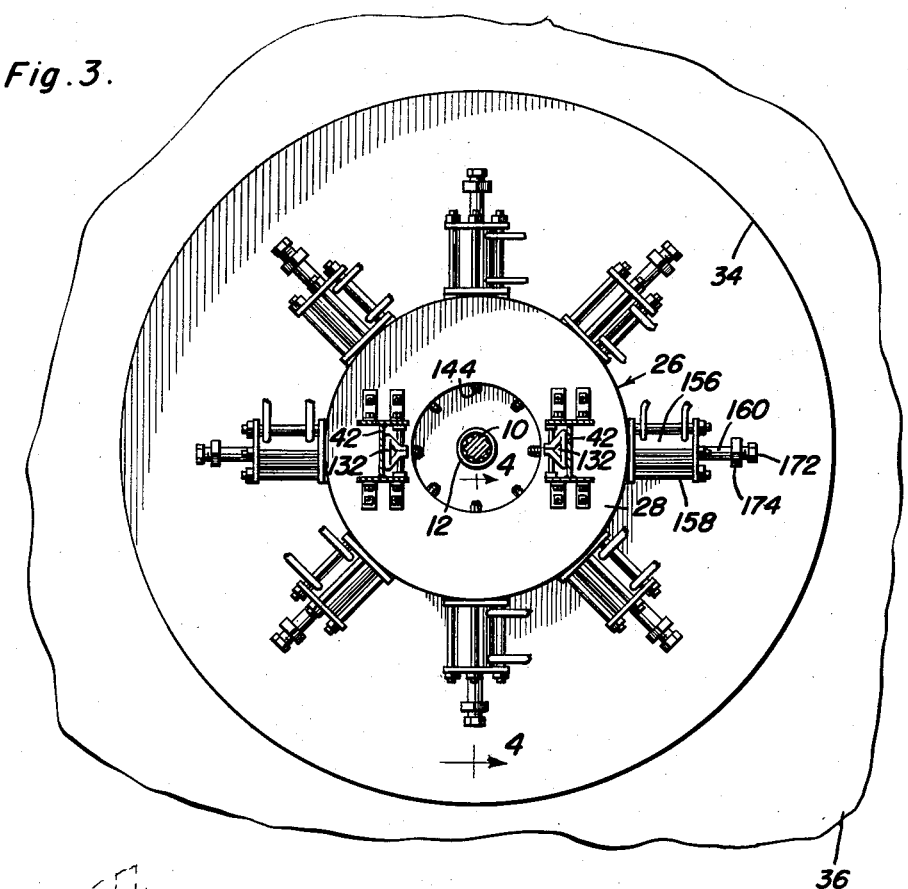
Figure 3 is a transverse horizontal sectional view taken substantially on the plane of section line 3—3 of Figure 1.
Figure 4:
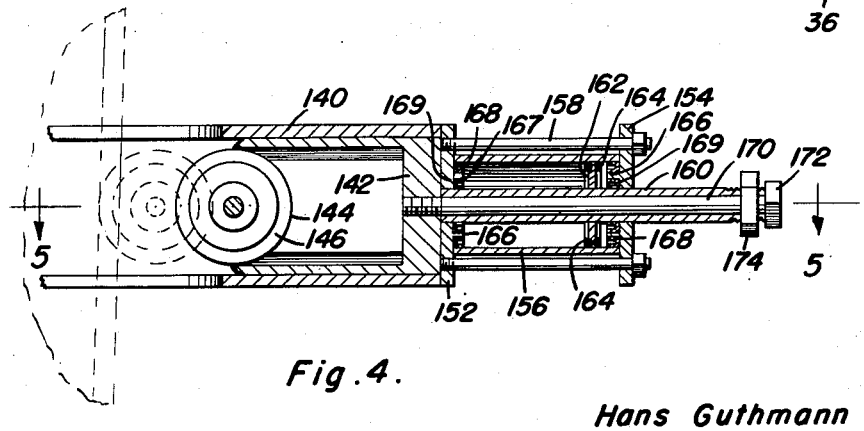
Figure 4 is an enlarged, fragmentary, vertical sectional view taken substantially on the plane of section line 4—4 of Figure 3.

Referring now to the drawings in detail, wherein, for the purpose of illustration, there is disclosed a preferred embodiment of the present invention, the numeral 10 represents an elongated and tapered cylindrical mandrel upon which the fluting of a sheet metal column 12 is performed. The mandrel 10 is provided with a plurality of circumferentially spaced, longitudinally extending flat surfaces 14 that are spaced from each other by further flat surfaces 16.

The flat inner surfaces 18 of a plurality of elongated ribs 20 bear against the surfaces 14 and these ribs 20 are preferably semi-circular in cross-section. Longitudinal strips 22 integrally formed with the surfaces 18 of the ribs 20 are suitably fixed in grooves or recesses 24 provided in the surfaces 14.

Base construction

The numeral 26 represents the base that is used in conjunction with the present invention generally, and which includes upper and lower ring members 28 and 30 that are retained spaced parallel to each other by spacers 32 fixed between the said upper and lower plates. The base 26 is disposed in a recess 34 in a floor 36 and surrounds a vertically extending pit or hole 38 having a ladder 40 disposed therein so that the pit may be cleaned by attendants using the ladder.

Support

A pair of H-beams or I-beams 42 rise from diametrically opposite sides of the upper plate 28 and are removably secured to the plate 28 by brackets 44. The beams 42 extend vertically in spaced parallel relationship and their upper ends are joined by a cross-head 46.

Carriage

A vertically movable carriage 48 is associated with the support or beams 42 and includes a plurality of guide rollers 50 that track along the flanges of the beams 42.

Mandrel raising and lowering means

The cross-member or head 46 is provided with a central opening 52 that receives the open end of a pump cylinder 54 and a flange 56 at the open end of the pump cylinder 56 is suitably fixed in a recess 58 in the lower face of the cross-member 46.

The upper flanged portion 60 of the pump cylinder 54 is secured to an end plate 62 by fasteners or the like 64 and the end plate 62 is centrally apertured, as at 66, to receive a tubular conduit or piston rod 68 that is disposed axially of the pump cylinder 54. The upper end of the piston rod 68 is threaded and receives suitable washers 70 and nuts 72 for holding the piston rod 68 relative to the end plate 62.

An annular shoulder or ring 74 is fixed to and depends from the lower face of the end plate 62 and is spaced from the periphery of the piston rod 68 and the inner periphery of the pump cylinder 54. An inner flexible inverted channel-shaped sealing ring 76 bears against the lower face of the end plate 62 and is disposed between the ring 74 and the outer periphery of the piston rod 68 to prevent fluid in the pump cylinder from passing outwardly through the aperture 66, and an outer flexible, inverted, channel-shaped sealing ring 78 bears against the lower face of the end plate 62 and is disposed between the ring 74 and the inner periphery of the pump cylinder 54 to prevent fluid in the pump cylinder from passing between the flanged portion 60 and the end plate 62.

A cylinder 80 is slidably received in the open lower end of the pump cylinder 54 and its upper wall 82 is centrally apertured, as at 84, to slidably receive the piston rod 68. A ring 86 rises from the upper wall 82 and is spaced from the outer periphery of the piston rod 68 and the inner periphery of the pump cylinder 54.

An inner flexible, preferably leather, channel-shaped sealing ring 88 bears against the upper face of the end wall 82 and is disposed between the ring 86 and the outer periphery of the piston rod 68 to prevent fluid in the pump cylinder 54 or cylinder 80 from passing through the opening 84. An outer flexible, preferably leather, channel-shaped ring 90 bears against the upper face of the upper wall 82 and is disposed between the ring or shoulder 86 and the inner periphery of the pump cylinder 54 to prevent a fluid in the pump cylinder 54 from passing between the outer walls of the cylinder 80 and the inner walls of the pump cylinder 54. A further sealing ring 87 is recessed in the lower face of the wall 82 for contacting the rod 68.

A piston head 92 is fixed to the lower end of the piston rod 68 and is disposed within the cylinder 80. This piston head 92 is provided with an annular rib or ring 94 on its upper surface that is spaced from the inner surface of the cylinder 80, and a flexible, preferably leather, channel-shaped sealing ring 96 bears upon the upper face of the piston head 92 and is disposed between the rib 94 and the inner periphery of the cylinder 80 to prevent fluid entering the cylinder 80, by way of a transverse delivery port 98 in the piston rod 68, from passing downwardly between the piston head 92 and the inner periphery of the cylinder 80.

The upper open end of the piston rod 68 receives a delivery line 100 and the pump cylinder 54 is provided with a combined inlet and outlet nipple 102 that is connected to a combined inlet and outlet line 104.

Means securing the carriage and the mandrel to the mandrel raising and lowering means The carriage 48 is provided with a socketed member 106 that embraces and which is threaded to the lower open and externally threaded end 108 of the cylinder 80.

A retaining plug 110 forming a part of member 106 is fitted in the end 108 and includes a central, upwardly and inwardly tapered opening 112 that receives a threaded rod 114 projecting from the upper, smooth surfaced, cylindrical end portion 116 of the mandrel 10.

A nut 118 is threaded on the rod 114 and bears upon the plug 110 to hold the mandrel relative to the cylinder 80 and so that the mandrel can swing to a vertically inclined position when the carriage and the mandrel are raised to their uppermost position or to a raised position so that the lower end of the mandrel is disposed above the base 26.

The lower end of the rod 114 is enlarged to form a frusto-conical portion 120 that will be seated in the opening 112 when the mandrel and the carriage are being lowered to prevent endwise movement of the mandrel relative to the cylinder 80 during the lowering operation of the mandrel.

*Means for loosening a column from the mandrel during the raising of the mandrel*

Means is provided for loosening the metal column 12 from the mandrel as the mandrel and column are raised, and this means comprises a collar 122 slidably received on the upper end portion 116 of the mandrel.

The lower edge 123 of the collar 122 normally bears upon a shoulder or rib 124 on the portion 116 and the upper end of the collar 122 is formed with a flange 126 from which lugs 128 rise.

The lower end of the collar 122 is provided with a depending sleeve or skirt 130 having an inner diameter slightly greater than the outer diameter of the rib 124 so that the same can slide downwardly over the rib 124 to abut the upper edge of the metal column 12.

A pair of pivotal arms or holding members 132 are secured to the beams 42, adjacent the lower ends of the beams, and are swung inwardly to grip the lugs 128 after the mandrel and the column have been lowered into the pit 38.

When the mandrel and the column are raised from their lowered position, as shown in Figure 11, the collar 122 will be held against upward movement so that the skirt 130 will hold the column 12 against upward movement until the mandrel has been raised a slight amount, thereby loosening the column from the mandrel. The arms 132 are then removed from the lugs 128 after the mandrel has been raised and swung to a vertically inclined position and the column is then raised from the rollers.

A set screw 134 carried by the collar 122 is adjustable to bear against the end portion 116 when it is desirable to space the skirt 130 above the rib 124.

*Means for swinging the mandrel and column thereon to a vertically inclined position during the raising of the same*

Means is provided for swinging the mandrel 10 to a vertically inclined position automatically with the raising of the same so that the column can be quickly and readily removed from its supported position on the rollers 144. This means comprises a contact arm or laterally projecting member 136 that is rigidly secured to the end portion 116.

A stop 138 fixed to and projecting laterally from one of the beams 42 will abut the arm 136 after the mandrel has been raised from the pit and the base 26 to swing the mandrel to the position shown in Figure 2, at which time the column can be removed from the rollers 144 by hand or by suitable mechanical means, such as a hoist.

*Flute forming means*

A plurality of circumferentially spaced, radially disposed, guides or open-ended casings 140 are fixed between the upper and lower plates 28 and 30 of the base 26 and slidably receive roller units or slides 142 having inner bifurcated ends that rotatably support rollers 144. The rollers 144 have beveled edges 146 and 148 and are slightly thicker than the width of the surfaces 14 for a purpose which will later be more fully apparent.

The outside end flanges 150 of the guides 140 are removably secured to the end flanges 152 and 154 of a plurality of cylinders 156, by bolts and nuts 158, so that the end plates 152 bear against the flanges 150 and the cylinders 156 are disposed in longitudinal alignment with the guides 140 and slides 142.

The end flanges or plates 152 and 154 are centrally apertured to slidably receive tubular piston rods 160 that support piston heads 162. The piston heads 162 support flexible, channel-shaped sealing rings 164 on both their faces that will expand during movement of the piston rods 160 and piston heads 162 to prevent a fluid within the cylinders 156 from passing between the inner peripheries of the cylinders 156 and the outer peripheries of the piston heads 162.

Rings 166 are provided on the inner faces of the end plates 152 and 154 and are spaced from the outer peripheries of the piston rods 160. Flexible, channel-shaped sealing rings 168 bear against the inner faces of the end plates 152 and 154 and are disposed between the outer peripheries of the piston rods 160 and the rings 166 to prevent a fluid within the cylinders 156 from passing between piston rods 160 and the end plates 152 and 154 and outwardly of the cylinders 156 and further flexible sealing rings 167 are received in channels 169 provided in the rings 166 and bear against the rods 160.

Rods 170 are received in the piston rods 160 and are threaded to the slides 142. The outer head ends 172 of the rods 170 abut the outer ends of the piston rods 160 so that the rods 170 and slides 142 will be moved with the piston rods 160.

The outer ends of the piston rods 160 are threaded to receive adjustable stops or nuts 174 that will engage the end plates 154 to limit the inward sliding movement of the members 142.

Each of the cylinders 156 is provided with a pair of combined inlet and outlet ports 176 that are connected by branch pipes 178 to a supply conduit 180.

Reference is now directed to Figure 12, wherein there is disclosed the hydraulic system employed in conjunction with the present invention. This hydraulic system includes a source of supply or tank 182 that is connected to the supply line 180 and to the intake side of a suitable pump, such as a gear pump 184, by a conduit or line 186.

A pair of branch lines 188 and 190 extend from the outlet side of the pump 184 and are connected to a pump cylinder 192 for moving a main piston head 194 in the cylinder 192. The piston head 194 is secured to a piston rod 196 that supports a plurality of auxiliary piston heads 198. The piston heads 198 are mounted in further cylinders 200.

It should be noted that there is a cylinder 200 for each cylinder 156 and that the conduits 178 leading from each cylinder 156 are connected to the cylinders 200 associated therewith so that as the main piston head 194 is moved in one direction the piston heads 198 will be moved in a similar direction to simultaneously actuate the piston rods 160.

The pump cylinder 192 is provided with any suitable number of check valves or release valves 202, that are manually operated for stopping the movement of the piston heads 194 and 198 at any desired point in case the flutes formed in the column 12 are not to be continuous. The valve 202 will return a predetermined fluid pressure with the cylinder 192.

Since the source of power 184 is common for both the roller actuating mechanism and the mandrel raising and lowering mechanism, the lines 100 and 104 are connected to the branch lines 190 and 188, respectively, although control valves 204 and 206 are disposed in the lines 100 and 104 so that fluid pressure to the mandrel raising and lowering mechanism can be arrested when desired by a manual actuation of the valves 204 and 206.

A pair of lines 208 and 210 branch from the lines 188 and 190, respectively, and lead to the source 182 and these latest lines, namely, lines 208 and 210, constitute return lines for the cylinders 54, 156, 192, and 200.

The lines 208 and 210 are controlled by valves 212 and 214 suitably secured thereto and the lines 188 and 190 are controlled by valves 216 and 218.

Means is provided for checking any loss of fluid in the lines 178 and the cylinders 156 and thereby permitting equalized movement of the slides 142. This means comprises a check valve 220 in each line 178 so positioned as to permit a small quantity of the hydraulic fluid used to be disposed adjacent the cylinders 200, as an induction charge to be sucked into the cylinders 200 when needed.

In practical use of the present invention, a tapered cylindrical metal column, such as at 12, is slipped upwardly over the mandrel and is frictionally fitted to the mandrel.

The cylinder 80 is then lowered by fluid entering the cylinder 54 through the line 104 and the column is forced between the rollers 144 at which point the portion 120 will enter seat 112.

As the mandrel and column are lowered into the pit 38, the fluid from the source 182 will be forced into the ports 176 to move the slides 142 and rollers 144 outwardly to accommodate the taper of the column and portions of the column will be forced against the surfaces 16 of the mandrel as shown in Figure 7.

If a portion of the column is not to be fluted, the valves 202 can be controlled to move the rollers 144 so that the same will not press against the column.

After the column has been lowered into the pit and fluted, to the desired degree, the valve 204 is opened and the valves 206, 216 and 218 are closed to retain the rollers 144 in their outermost position. As fluid is pumped through the line 100 and enters the cylinder 80 between the piston head 92 and end wall 82, the cylinder 80 will be raised and likewise the carriage 48, mandrel 10 and column 12.

Obviously, the column is loosened from the mandrel and the mandrel is raised and swung to a vertically inclined position as previously described, through the use of the arms 132 and stop 138 and the column 12 is removed from the rollers 144 supporting the same.

By controlling the fluid entering cylinders 156 so that the rollers 144 will move inwardly as the mandrel is raised, it is apparent that the column 12 could be fluted as the same is raised from its position in the pit although this operation is less desirable due to the swivel connection 114 and the fact that other loosening means for separating the column from the mandrel must be enforced.

An important feature of the invention is the manner in which the parts can be conveniently serviced for inspection or replacement of the leather rings used or the other parts, and in this regard it is noted that the sealing rings will expand or spread in response to an internal pressure in the cylinders where the same are employed.

Then, too, the vertical movement of the mandrel will effect any equalizing stress on the column or pressure on the column by the rollers and the weight of the column and mandrel will aid the forming of flutes in the column.

Having described the invention, what is claimed as new is:

1. In a machine for fluting tapered metal columns, a tapering mandrel, a vertically disposed support, a vertically movable carriage slidable on the support and secured to the mandrel, a base for the support, a plurality of rollers slidably mounted on the base and disposed radially of the mandrel for pressing a column against the mandrel, and a common hydraulic means for simultaneously imparting vertical movement to the carriage and horizontal movement to the rollers, said hydraulic means including means associated with said rollers for resisting the pressure placed on the rollers by a column mounted on the mandrel.

2. In a machine for fluting tapered metal columns, a tapering mandrel having a plurality of circumferentially spaced, longitudinally extending, tapering ribs; a base embracing the mandrel; a plurality of rollers disposed radially of the mandrel, slidably carried by the base and arranged substantially perpendicular to the mandrel; a support rising from and secured to the base; a vertically movable carriage carried by the support and secured to the mandrel; means mounted on the support for raising and lowering the carriage; and means for urging the rollers from the mandrel during the lowering of the mandrel and the carriage and including a means associated with the rollers for resisting the pressure placed on the rollers by the work.

3. In a machine for fluting tapered metal columns, a tapering mandrel having a plurality of circumferentially spaced, longitudinally extending, tapering ribs, a base embracing the mandrel, a plurality of rollers disposed radially of the mandrel, said rollers being slidably carried by the base and arranged substantially perpendicular to the mandrel, a support rising from and secured to the base, a vertically movable carriage carried by the support and secured to the mandrel, hydraulic means mounted on the support for raising and lowering the mandrel and the carriage, further hydraulic means for moving the rollers from the mandrel during lowering of the mandrel, and a common source of power for said hydraulic means and said further hydraulic means, said further hydraulic means including means associated with the rollers for resisting the pressure placed on the rollers by a column embracing the mandrel.

4. The combination of claim 3 and means for loosening a column from the mandrel during the raising thereof.

5. The combination of claim 4 wherein said means includes a pair of holding arms pivoted to said support.

6. The combination of claim 3 and means for swinging the mandrel at a vertically inclined position for removing the column from the rollers after the raising of the mandrel.

7. The combination of claim 6 wherein said means includes a stop secured to said support, a swivel connection between the mandrel and the carriage, and a contact arm fixed to the mandrel for engaging the stop.

8. In a machine for fluting tapered metal columns, a tapering mandrel having a plurality of longitudinally extending, circumferentially spaced tapering ribs, a base having an opening for receiving the mandrel and a column mounted on the mandrel, a series of slides carried by the base, movable radially of the mandrel and supporting rollers for pressing a column over the ribs, a support rising from the base, a vertically movable carriage mounted on the support, means securing the carriage to the mandrel, guides mounted on the base slidably receiving the slides, means for actuating the slides to urge the slides from the mandrel during lowering of the mandrel, adjustable stop means limiting sliding movement of the slides relative to the guides, and means for raising and lowering the carriage, said slide actuating means including means associated with the slides for resisting the pressure placed on the rollers by a column mounted on the mandrel 9. The combination of claim 8 wherein said means for actuating said slides includes a pump cylinder mounted on each of said guides, tubular piston rods slidably carried by said cylinders, pistons on said rods and received in said cylinders and operating rods secured to said slides and received in said rods.

10. The combination of claim 8 wherein said means for actuating said slides includes a pump cylinder mounted on each of said guides, tubular piston rods slidably carried by said cylinders, pistons on said rods and received in said cylinders and operating rods secured to said slides and received in said rods, said adjustable stop means including nuts threaded on said rods and adapted to abut the cylinders.

11. The combination of claim 10 and means for sealing the piston rod to the cylinders and preventing fluid within the cylinders from passing from the said cylinders.

12. The combination of claim 11 wherein said means includes a plurality of continuous channel shaped, flexible sealing rings, said rings being responsive to internal pressures within the cylinders for expanding.

13. The combination of claim 3 wherein said mandrel includes a plurality of longitudinally extending flat surfaces, said surfaces being disposed between adjacent ribs, said rollers being double beveled and having peripheral surfaces opposing the flat surfaces of said mandrel.

14. In a machine for fluting tapered metal columns, a tapering mandrel having a plurality of longitudinally extending, circumferentially spaced tapering ribs, a base having an opening for receiving the mandrel and a column mounted on the mandrel, a series of slides carried by the base, disposed radially of the mandrel and supporting rollers for pressing a column over the ribs, a support rising from the base, a vertically movable carriage mounted on the support, means securing the carriage to the mandrel, guides mounted on the base slidably receiving the slides, means for actuating the slides to move the slides from the mandrel during lowering of the mandrel, adjustable stop means limiting sliding movement of the slides relative to the guides, and means for raising and lowering the carriage, said means securing said carriage to said mandrel including a swivel connector permitting swinging movement of the mandrel relative to the carriage, said slide actuating means including means associated with said slides for resisting the pressure placed on the rollers by a column mounted on the mandrel.

15. In a machine for fluting tapered metal columns, a tapering mandrel having a plurality of longitudinally extending, circumferentially spaced tapering ribs, a base having an opening for receiving the mandrel and a column mounted on the mandrel, a series of slides carried by the base, said slides being disposed radially of the mandrel and supporting rollers for pressing a column over the ribs, a support rising from the base, a vertically movable carriage mounted on the support, means securing the carriage to the mandrel, guides mounted on the base slidably receiving the slides, means for moving the slides from the mandrel during lowering of the mandrel, adjustable stop means limiting sliding movement of the slides relative to the guides and toward the mandrel, means for raising and lowering the mandrel and the carriage, means for loosening a column from the mandrel during the raising of the mandrel and a column on the mandrel, and means for swinging the mandrel at an inclined angle to the support during the raising of the mandrel, said slide moving means including means associated with the slides resisting pressure on the rollers by a column on the mandrel.

16. The combination of claim 15 wherein said means for loosening a column from the mandrel includes a pair of holding arms pivoted on said support and a collar on said mandrel adapted to abut a column on the mandrel and engageable with said holding arm.

17. The combination of claim 15 wherein said last-mentioned means includes an arm fixed to and projecting laterally from the mandrel, and a stop on the support adapted to engage said arm during the raising of the mandrel.

HANS GUTHMANN.

REFERENCES CITED

The following references are of record in the file of this patent:

UNITED STATES PATENTS

| Number | Name | Date |
| --- | --- | --- |
| 838,569 | Numan | Dec. 18, 1906 |
| 890,526 | Numan | June 9, 1908 |
| 1,714,108 | Schlafly | May 21, 1929 |
| 1,747,602 | Riemenschneider | Feb. 18, 1930 |
| 2,155,973 | Irwine et al. | Apr. 25, 1939 |